United States Patent

[11] 3,625,950

| [72] | Inventors | Edward J. Cragoe, Jr.; |
| | | Norman P. Gould, both of Lansdale, Pa. |
| [21] | Appl. No. | 742,129 |
| [22] | Filed | July 3, 1968 |
| [45] | Patented | Dec. 7, 1971 |
| [73] | Assignee | Merck & Co., Inc. |
| | | Rahway, N.J. |

[54] CERTAIN HALOPHENOXY ALKANAMIDES, HYDRAZIDES AND DERIVATIVES THEREOF
5 Claims, No Drawings

[52] U.S. Cl........................................................ 260/295 H,
260/247.2, 260/268 R, 260/294 A, 260/295.5 H, 260/309, 260/309.6, 260/473, 260/521 A, 260/553 E, 260/559 H, 260/612 R, 424/248, 424/266, 424/267, 424/273, 424/274, 424/320

[51] Int. Cl........................................................ C07d 31/44
[50] Field of Search............................................ 260/295 H, 295.5 H, 559 H

[56] References Cited
UNITED STATES PATENTS

| 3,439,018 | 4/1869 | Brookes ...................... | 260/471 |
| 3,449,350 | 6/1969 | Walker........................ | 260/295.5 |

OTHER REFERENCES

Fieser and Fieser, Advanced Organic Chemistry, Reinhold, pp. 502, 1961, QD251F5a

*Primary Examiner*—Alan L. Rotman
*Attorneys*—Joseph W. Molasky, J. Jerome Behan and I. Louis Wolk

ABSTRACT: The invention relates to $\omega,\omega$-dimethyl-$\omega$-(halophenoxy)-alkanamides, i.e., alkanamides bearing a halophenoxy and two methyl groups on the terminal carbon atom. The products are obtained by treating the corresponding $\omega,\omega$-dimethyl-$\omega$-(halophenoxy)alkanoic acid ester or imidazole derivative thereof with an amine to form the desired amide. The said products are hypoglycemic agents, that is, they reduce the concentration of glucose in the blood.

CERTAIN HALOPHENOXY ALKANAMIDES, HYDRAZIDES AND DERIVATIVES THEREOF

This invention relates to a novel class of chemical compounds, which can be described generally as ω, ω-dimethyl-ω-(halophenoxy) alkanamides.

Studies show that in the disease diabetes the level of glucose in the blood reaches abnormally high concentrations, which if allowed to continue may lead to various complications which have been well documented in the literature. The purpose of this invention is to disclose a new class of chemical compounds which effectively reduce the glucose level in the blood and consequently are useful in the treatment of the conditions associated with diabetes.

The instant amides are products having the following general formula:

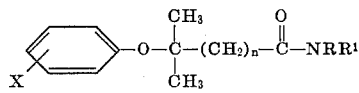

wherein R is hydrogen, lower alkyl, aryl lower alkyl, lower alkoxy lower alkyl, di-lower alkylamino lower alkyl, lower alkoxy, amidino, N-lower alkyl amidino, N,N-di-lower alkylamidino, N,N-diphenylamidino, 2-imidazolin-2-yl, amino, lower alkylamino, di-lower alkylamino, pyridylamino, such as 2-pyridylamino and the like, piperidino or carbamoyl; $R^1$ is hydrogen or lower alkyl and when R and $R^1$ are lower alkyl they may be joined together either directly or through a hetero atom such as oxygen, nitrogen and the like to form with the nitrogen to which they are attached a cyclic radical such as 1-pyrrolidinyl, piperidino, morpholino, 1-piperazinyl, 4-lower alkyl-1-piperazinyl, 1-imidazolyl and the like; n is an integer of 1-4 and x is halogen such as bromo, chloro, fluoro, iodo and the like.

A preferred embodiment of this invention relates to 4-(4-clorophenoxy)-4-methylpentanamides of the following formula:

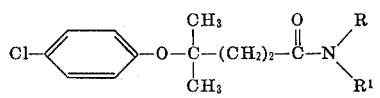

wherein R is lower alkyl, di-lower alkylamino lower alkyl, amino, pyridylamino, 2-imidazolin-2-yl, amidino or carbamoyl and $R^1$ is hydrogen or R and $R^1$ taken together with the nitrogen to which they are attached is a 1-imidazolyl radical.

The products of this invention are conveniently prepared by either of two methods. The first method is the reaction of an ester of ω,ω-dimethyl-ω-(halophenoxy)-alkanoic acid with an appropriate amine. The following equation illustrates this manner of synthesis:

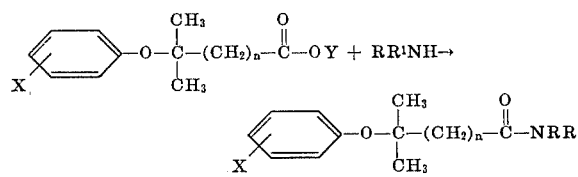

wherein Y is lower alkyl for example methyl, ethyl, propyl, and the like and n, R, $R^1$ and X are as defined above. This reaction is conducted in the absence of a solvent or in a solvent which is substantially inert to the reactants, as for example, in a lower alkanol such as methanol, ethanol, tert-butanol, and the like, dimethyl formamide, dioxane, 2-methoxyethanol, 1,2-dimethoxyethane, tetrahydrofuran and the like or an excess of the amine reactant. The reaction is usually conducted at ambient temperature; however, it is sometimes advantageous to employ temperatures of 30° to 120° C. for the less active reagents.

The products of this invention may also be prepared by reacting the 1-[ω, ω-dimethyl-ω-(halophenoxy)-alkanoyl] imidazole with an amine to form the ω, ω-dimethyl-ω-(halophenoxy)alkanamides. The following equation illustrates this method of synthesis:

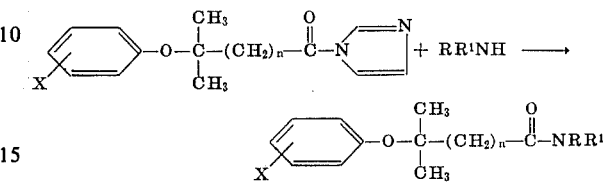

wherein n, R and $R^1$ and X are as defined above. This reaction is conducted in a solvent which is substantially inert to the reactants such as tetrahydrofuran, dioxane, 1,2-dimethoxyethane, diethylene glycol dimethyl ether, and the like. Temperature is not critical to the reaction and, in general, the reaction is most advantageously conducted at ambient temperature. The instant ω, ω-dimethyl-ω-(halophenoxy)-alkanamides may be purified by recrystallization from suitable solvents such as the lower alkanols, carbon tetrachloride, acetonitrile, n-heptane and the like.

The 1-[ω, ω-dimethyl-ω-(halophenoxy)alkanoyl]-imidazole starting materials are prepared by reacting a ω, ω-dimethyl-ω-(halophenoxy)alkanoic acid with a solution of imidazole which has been treated with thionyl chloride as illustrated by the following equation:

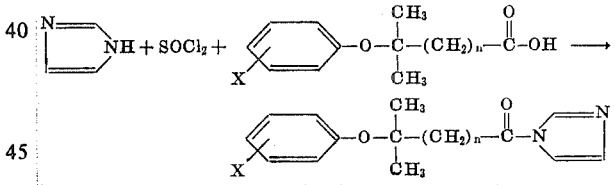

wherein n and X are as defined above.

The ω, ω-dimethyl-ω-(halophenoxy)alkanoic acids and corresponding ester derivatives employed at starting materials in the foregoing procedures can be prepared by several methods. Thus, for example, the 4-(halophenoxy)-4-methylpentanoic acids and 6-(halophenoxy)-6-methylheptanoic acids and the ester derivatives thereof may be obtained by treating the appropriate halophenol with chloroform and acetone in the presence of a base to form the corresponding 2-(halophenoxy)-2-methyl-propionic acid, which acid is then esterified by treatment with a lower alkanol and the resulting ester treated with lithium aluminum hydride to afford 2-(halophenoxy)-2-methyl-1-propanol; the propanol intermediate thus obtained is then converted to its corresponding 2-(halophenoxy)-2-methylpropion-aldehyde by treatment with dicyclohexylcarbodiimide and the said aldehyde is reacted, in the presence of a base, with either a tri-loweralkylphosphonoacetate or tri-loweralkyl 4-phosphonocrotonate to yield, respectively, the ester derivatives of 4-(halophenoxy)-4-methyl-2-pentenoic acid and 6-(halophenoxy)-6-methyl-2,4-heptadienoic acid, which are catalytically hydrogenated to yield, respectively, the ester derivatives of 4-(halophenoxy)-4-methylpentanoic acid and 6-(halophenoxy)-6-methylheptanoic acid followed by the hydrolysis of the said esters to the desired acid products. The following equation illustrates this method:

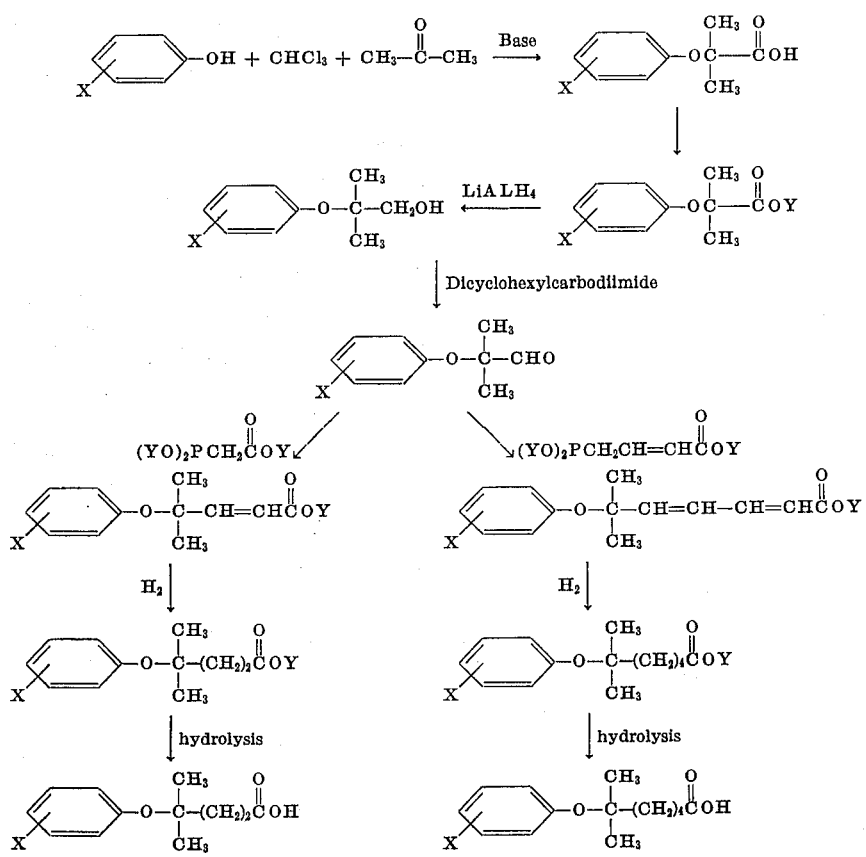

wherein X and Y are as defined above.

The 5-(halophenoxy)-5-methylhexanoic acids are prepared by reducing the ester derivative of the 4-(halophenoxy)-4-methylpentanoic acids with lithium aluminum hydride to the corresponding 4-(halophenoxy)-4-methylpentanol which upon treatment with a halogenating agent, such as phosphorous tribromide, yields the 4-(halophenoxy)-4-methylbutyl halide which is then reacted with an alkali metal cyanide, such as sodium cyanide, to produce 5-(halophenoxy)-5-methylbutyronitrile which, upon treatment with a base, such as potassium hydroxide, yields the desired 5-(halophenoxy)-5-methylhexanoic acid derivative:

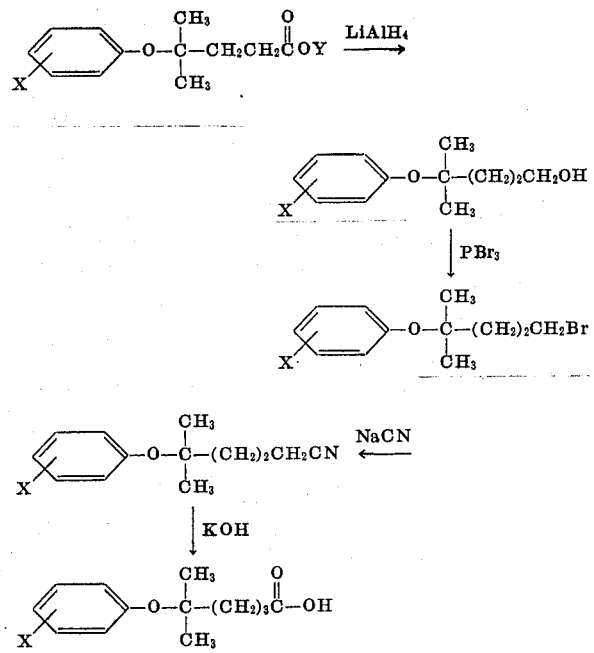

wherein X and Y are as defined above.

The 3-(halophenoxy)-3-methylbutyric acids are prepared by treating the ester derivatives of a 4-(halophenoxy)-4-methylpentanoic acid with phenylmagnesium halide to produce the 1,1-diphenyl-4-(halophenoxy)-4-methyl-1-pentanol which is then treated with a dehydrating agent, such as boron trifluoride etherate, and the resulting 1,1-diphenyl-4-(halophenoxy)-4-methyl-1-pentene is treated with an oxidizing agent, such as chromium trioxide, to yield the desired 3-(halophenoxy)-3-methylbutyric acid:

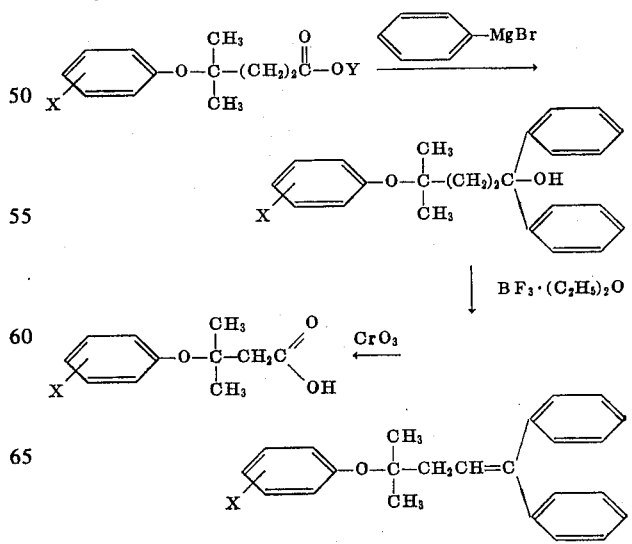

wherein X and Y are as defined above.

The disease of diabetes is characterized by an abnormally high concentration of glucose in the blood (i.e., hyperglycemia). This indicates that the glucose has not yet entered into the usual paths of intermediate metabolism and therefore can lead to an accumulation of ketone substances in the body with resultant acidosis and, eventually, coma.

Since in the control of diabetes it is necessary to cause a decline of the blood glucose level, a chemical therapeutic agent which produces this desired effect would prove useful in the treatment of the disease. The ω,ω-dimethyl-ω-(halophenoxy)alkanamides were synthesized, tested, and found to exhibit hypoglycemic activity.

The following Examples illustrate the ωω-dimethyl-ω-(halophenoxy)alkanamides of this invention and also the methods by which they are prepared.

EXAMPLE 1

N-Amino-4-(4-chlorophenoxy)-4-methylpentanamide

Step A: 2-(4-Chlorophenoxy)-2-methylpropionic acid

To a mixture of p-chlorophenol (128.6 g., 1.0 mole) and sodium hydroxide (200 g., 5.0 mole) in acetone (1.0 l.) is added chloroform (143.0 g., 1.2 mole) dropwise. The mixture is refluxed for 5 hours and the solvent is removed in vacuo to give a residue which is dissolved in water (400 ml.). This aqueous solution is washed with ether (3×75 ml.), acidified with 6N hydrochloric acid and extracted with chloroform (4×75 ml.). The combined chloroform extracts are washed with water, dried over anhydrous magnesium sulfate and evaporated in vacuo to give the crude product which is recrystallized from methanol yield 129 g. (60 percent yield) of 2-(p-chlorophenoxy)--methylpropionic acid, m.p., 118°–119° C.

Step B: Ethyl 2-(4-chlorophenoxy)-2-methylpropionate

A solution of 2-(4-chlorophenoxy)-2methylpropionic acid (50.6 g., 0.236 mole) in ethanol (200 ml.) containing concentrated sulfuric acid (5 ml.) is refluxed for 16 hours. This solution is evaporated to half the original volume, cooled and diluted with ether (250 ml.). This ether solution is washed with an aqueous sodium bicarbonate solution (25 g. in 250 ml.) and then water. The ether solution is dried over anhydrous magnesium sulfate and filtered. The ether is removed in vacuo and the residue is distilled to give 34.5 g. (60 percent yield) of ethyl 2-(4-chlorophenoxy)-2-methylpropionate, b.p., 159°–165° C. (24–26 mm.), $n_D^{19\ °C} = 1.5050$.

Step C: 2-(4-Chlorophenoxy)-2-methyl-1-propanol

To a suspension of lithium aluminum hydride (76 g., 2.0 mole) in anhydrous ether (5.0 l.) is added dropwise over a period of 1.5 hours, a solution of ethyl 2-(4-chlorophenoxy)-2-methylpropionate (270 g., 1.11 mole) in anhydrous ether (1.08 l.). After the addition is complete the mixture is refluxed under nitrogen for one hour and then cooled to room temperature. The excess lithium aluminum hydride is decomposed by the slow addition of ethyl acetate (143 ml.). The mixture is cooled to 10°–15° C. and water (3.81 l.) is added, cautiously at first, at a rate sufficient to prevent excessive foam. The resulting thick mixture is acidified with concentrated hydrochloric acid (640 ml.) and allowed to stir at room temperature over night. The ether layer is removed and washed successively with water (590 ml.), aqueous sodium bicarbonate solution (590 ml., 10 percent) and water (590 ml.); it is then dried over anhydrous magnesium sulfate, filtered and the ether removed by distillation at reduced pressure to give an oily residue. The total of three identical runs yields 820 g. of oil. Distillation yields 612 g. (91 percent yield) of 2-(4-chlorophenoxy)-2-methyl-1-propanol, b.p., 86°–90° C. at 0.05 mm.

Step D: 2-(4-Chlorophenoxy)-2-methylpropionaldehyde

A mixture of 2-(4-chlorophenoxy)-2-methyl-1-propanol (40 g., 0.2 mole) and dicyclohexylcarbodiimide (170 g., 0.8 mole) in anhydrous dimethyl sulfoxide (800 ml.) is warmed on a steam bath until a solution is obtained. An 85 percent aqueous solution of phosphoric acid (8.0 ml.) is added and stirring and heating, on a steam bath, is continued for one hour. A white solid precipitates and this mixture is stirred at room temperature over night. Heating is continued on a steam bath for an additional hour after which time water (50 ml.) is added dropwise over a 1 hour period while heating and stirring are continued. The reaction mixture is cooled and the solid collected by filtration. The collected solid is washed successively with water (1.5 l.) and ether (1.0 l.). The combined filtrates are shaken together and the ether layer is separated, washed with water and dried over anhydrous magnesium sulfate. Evaporation of the ether yields an oily residue which is distilled twice to yield 31.5 g. (80 percent yield) of 2-(4-chlorophenoxy)-2-methyl-propionaldehyde, b.p., 82°–83° C. at 0.5 mm.

Elemental analysis for $C_{10}H_{11}ClO_2$:
Calc.: C, 60.46; H, 5.58; Cl, 17.85;
Found: C, 60.78; H, 5.89; Cl, 18.28.

Step E: Ethyl 4-(4-chlorophenoxy)-4-methyl-2-pentenoate

To a mixture of 59 percent sodium hydride (4 g., 0.1 mole suspended in mineral oil) and 1,2-dimethoxy-ethane (200 ml.) is added triethylphosphonoacetate (22.4 g., 0.1 mole). After stirring at 25° C. for 1 hour, 2-(4-chlorophenoxy)-2-methyl-propionaldehyde (19.9 g., 0.1 mole) is added dropwise and the mixture is stirred for 4 hours after which time the supernatant is decanted and the remaining residue is diluted with 25 ml. of water and extracted with ether. The supernatant is evaporated under vacuum to yield a residue which is combined with the ethereal solution. This solution is washed successively with 5 percent aqueous sodium hydroxide and water, dried over anhydrous magnesium sulfate and evaporated the solvent in vacuo to yield 26.5 g. (98 percent yield) of ethyl 4-(4-chlorophenoxy)-4-methyl-2-pentenoate.

Step F: Ethyl 4-(4-chlorophenoxy)-4-methylpentanoate

A mixture of ethyl 4-(4-chlorophenoxy)-4-methyl-2-pentenoate (26.5 g., 0.099 mole) and 10 percent ruthenium on carbon (3.0 g.) in ethanol (150 ml.) is hydrogenated in a Parr apparatus at an initial pressure of 50 p.s.i. for 2 hours. The catalyst is removed by filtration under an atmosphere of nitrogen. Evaporation of the filtrate yields 24.8 g. (93 percent yield) of ethyl 4-(4-chlorophenoxy)-4methylpentanoate. N-Amino-4-(4-chlorophenoxy)-4-methylpentanamide A solution of ethyl 4-(4-chlorophenoxy)-4-methylpentanoate (8.12g., 0.03 mole), anhydrous hydrazine (9.6 g., 0.3 mole, 95 percent) and methanol (120 ml.) is allowed to stand at ambient temperature over night. The methanol is removed under vacuum and the resulting residue is triturated with water and extracted with ether. The ether extracts are washed with water, dried over anhydrous magnesium sulfate and evaporated under vacuum to yield 6.81 g. of liquid material which is crystallized from 6.5 ml. of carbon tetrachloride to yield 5.0 g. (65 percent yield) of N-amino-4-(4-chlorophenoxy)-4-methylpentanamide, m.p. 65.5°–66.5° C.

Elemental analysis for $C_{12}H_{17}ClN_2O_2$:
Calc: C, 56.14; H, 6.68; N, 10.91;
Found: C, 56.40; H, 6.62; N, 11.10.

By substituting for the p-chlorophenol, example 1, step A, an equivalent quantity of m-chlorophenol, and then o-chlorophenol, p-bromophenol, p-fluorophenol, and p-iodophenol and conducting the reaction as described in example 1, step A, there is obtained respectively 2-(3-chlorophenoxy)-2-methylpropionic acid, 2-(2-chlorophenoxy)-2-methylpropionic acid, 2-(4-bromophenoxy)-2-methylpropionic acid, 2-(4-fluorophenoxy)-2-methylpropionic acid and 2-(4-iodophenoxy)-2-methylpropionic acid and then using this product in step B, example 1, there is obtained the corresponding ethyl ester, i.e., ethyl 2-(3-chlorophenoxy)-2-methylpropionate, ethyl 2-(2-chlorophenoxy)-2-methyl-propionate, ethyl 2-(4-bromophenoxy)-2-methylpropionate, ethyl 2-(4-fluorophenoxy)-2-methylpropionate and ethyl 2-(4-iodophenoxy)-2-methylpropionate which are then reduced by following step C, example 1, to produce 2-(3-chlorophenoxy)-2-methyl-1-propanol, 2-(2-chlorophenoxy)-2-methyl-1-propanol, 2-(4-bromophenoxy)-2-methyl-1- propanol, 2-(4-fluorophenoxy)-2-methyl-1-propanol and 2-(4-iodophenoxy)-2-methyl-1-propanol which when used in step D, example 1, reacts with dicyclohexylcarbodiamide to yield the corresponding aldehyde. The respective aldehyde derivatives are then reacted further by following the procedure of example 1, step E, to produce, respectively, ethyl 4-(3-chlorophenoxy)-4-methyl-2-pentenoate, ethyl 4-(2-chlorophenoxy)-4-methyl-2-pentenoate, ethyl 4-( 4-bromophenoxy)-4-methyl-2-pentenoate, ethyl 4-(4-fluorophenoxy)-4-methyl-2-pentenoate and ethyl 4-(4-iodophenoxy)-4-methyl-2-pentenoate which are then converted to the corresponding saturated pentanoates by following the procedure in step F, example 1, which when substituted for the ethyl 4-(4-chlorophenoxy)-4-methylpentanoate of example 1, step G, yields, respectively, N-amino-4-(3-chlorophenoxy)-4-methyl pentanamide, N-amino-4-(2-chlorophenoxy)-4-methylpentanamide, N-amino-4-(4-bromophenoxy)-4-methylpentanamide, N-amino-4-(4-fluorophenoxy)-4-methylpentanamide and N-amino-4-(4-iodophenoxy)-4-methylpentanamide.

EXAMPLE 2

1-[4-(4-Chlorophenoxy)-4-methylpentanoyl]imidazole

Step A: 4-(4-Chlorophenoxy)-4-methylpentanoic acid

To a solution of potassium hydroxide (11.2 g., 0.2 mole) in water (10 ml.) and ethanol (100 ml.) is added a solution of ethyl 4-(4-chlorophenoxy)-4-methylpentanoate (24.8 g., 0.091 mole) in ethanol (20 ml.). The mixture is refluxed for 1 hour and allowed to stand overnight at room temperature. The solvent is evaporated under vacuum and to the residue is added 50 ml. of water. Extraction with ether gives 5.18 g. of neutral material which is discarded. The aqueous extracts are acidified with 6N hydrochloric acid and extracted with ether. The ether extracts are washed with water, dried over anhydrous magnesium sulfate, treated with charcoal, filtered and evaporated under vacuum to yield 16 g. of 4-(4-chlorophenoxy)-4-methyl- pentanoic acid (m.p., 70°–75° C.) which is purified by recrystallization from cyclohexane (30 ml.) to yield 12 g. (54 percent yield) of 4-(4-chlorophenoxy)-4-methylpentanoic acid, m.p., 77.5°–78.5° C.

Elemental analysis for $C_{12}H_{15}ClO_3$:
Calc.: C, 59.39; H, 6.23; Cl, 14.61;
Found: C, 59.60; H, 6.51; cl. 14.59.

Step B: 1-[4-Chlorophenoxy)-4-methylpentanoyl]-imidazole

A mixture of imidazole (2.72 g., 0.04 mole), thionyl chloride (1.14 ml., 0.01 mole) and tetrahydrofuran (60 ml.) is stirred for 0.5 hour at 20° C. and the reaction mixture filtered. To the filtrate is added 4-(4-chlorophenoxy) -4-methylpentanoic acid (12.4 g., 0.01 mole). The reaction mixture is stirred for 3 hours at ambient temperature, filtered and the filtrate evaporated under vacuum at 45° C. to yield 2.92 g. of crude 1-[4-(4-chlorophenoxy)- 4-methylpentanoyl]imidazole. The crude product is suspended in 50 ml. of acetone and the insoluble material removed by filtration. The acetone filtrate is concentrated to 17 ml., cooled and filtered to yield 1.72 g. of 1-[4-(4-chlorophenoxy)- 4-methylpentanoyl]imidazole (m.p., 127.5°–128.5° C.). Recrystallization from 8 ml. of acetone yields 1.37 g. (47 percent yield) of 1-[4-(4-chlorophenoxy)-4-methylpentanoyl]imidazole, m.p., 127.5°–128.5 ° C.

Elemental analysis for $C_{15}H_{17}ClN_2O_2$:
Calc.: C, 61.53; H, 5.85; N, 9.57;
Found: C, 61.75; H, 5.94; N, 9.48.

EXAMPLE 3

N-Carbamoyl-4-(4-chlorophenoxy)-4-methylpentanamide

A mixture of sodium urea (0.42 g., 0.005 mole), methyl 4-(4-chlorophenoxy)-4-methylpentanoate (1.28 g., 0.005 mole) and liquid ammonia (35 ml.) is stirred until all the ammonia has evaporated. The residue is triturated with water and crystallized from ethanol (10 ml.) to yield 0.59 g. (41 percent yield) of N-carbamoyl-4-(4-chlorophenoxy) -4-methylpentanamide, m.p. 123.5°–125.5° C.

Elemental analysis for $C_{16}H_{22}ClNO_4$:
Calc.: C, 54.83; H, 6.02; N, 9.84;
Found: C, 54.68; H, 5.91; N, 9.78.

EXAMPLE 4

N-(2-Imidazolin-2-yl)-4-(4-chlorophenoxy)-4-methylpentanamide

Step A: Methyl 4-(4-chlorophenoxy)-4-methylpentanoate

A solution of diazomethane (1.4 g., 0.034 mole) in ether (50 ml.) cooled to 0° C. is added to a solution of 4-(4-chlorophenoxy)-4-methylpentanoic acid (7.0 g., 0.029 mole) in ether (35 ml.). After the yellow color is discharged by passing nitrogen through the solution, the ethereal solution is washed successively with a saturated aqueous sodium bicarbonate solution and water and then dried over anhydrous magnesium sulfate.

Evaporation of the solvent in vacuo yields 7.38 g. (99 percent yield) of methyl 4-(4-chlorophenoxy)-4-methylpentanoate.

Step B: N-(2-Imidazolin-2-yl)-4-chlorophenoxy)-4-methylpentanamide

A solution of 2-amino-2-imidazoline hydrochloride (2.43 g., 0.02 mole) and sodium methoxide (1.08 g., 0.02 mole) in methanol (20 ml.) is stirred at ambient temperature for 1 hour. The resulting white suspension is filtered and the filtrate is evaporated under vacuum to yield 1.82 g. of 2-amino-2-imidazoline as an oil which is then mixed with methyl 4-(4-chlorophenoxy)-4-methylpentanoate (1.28 g., 0.005 mole) and heated on a steam bath for 3 minutes. The white solid which separates is collected and washed with water. Recrystallization form 40 ml. of ethanol yields 1.10 g. (71 percent yield) of N-(2-imidazolin-2-yl)-4-(4-chlorophenoxy) -4-methylpentanamide, m.p., 193°–194° C.

Elemental analysis for $C_{15}H_{20}ClN_3O_2$:
Calc.: C, 58.16; H, 6.51; N, 13.56;
Found: C, 58.35; H, 6.43; N, 13.70.

EXAMPLE 5

N-Amidino-4-(4-chlorophenoxy)-4-methylpentanamide

A mixture of imidazole (1.36 g., 0.02 mole), dry tetrahydrofuran (30 ml.) and thionyl chloride (0.58 ml., 0.005 mole) is stirred at 20° C. for 1 hour and then filtered. To the filtrate is added 4-(4-chlorophenoxy) -4-methylpentanoic acid (1.21 g., 0.005 mole) and stirring is continued at 25° C. for 2 hours. Guanidine (0.02 mole) is prepared by refluxing a mixture of guanidine hydrochloride (1.92 g., 0.02 mole) and sodium methoxide (1.08 g., 0.02 mole) in methanol (25 ml.) for 1 hour. This mixture is filtered and the filtrate is evaporated under vacuum at ambient temperature to yield guanidine which is then mixed with the solution of 1-[4-(4-chlorophenoxy)-4-methylpentanoyl]imidazole. The solvent is evaporated under vacuum to yield an orange mixture which is heated on a steam bath for 2 hours. This residue is triturated with water and recrystallized twice from acetonitrile to yield 0.60 g., (42 percent yield) of N-amidino- 4-(4-chlorophenoxy)-4-methylpentanamide, m.p. 133.5°–134.5° C.

Elemental analysis for $C_{13}H_{18}ClN_3O_2$:
Calc.: C, 55.03; H, 6.39; N, 14.81;
Found: C, 55.06; H, 6.18; N, 14.71.

EXAMPLE 6

N-(2-Diethylaminoethyl)-4-(4-chlorophenoxy)-4-methylpentanamide

A mixture of imidazole (2.72 g., 0.04 mole), thionyl chloride (1.14 ml., 0.01 mole) and tetrahydrofuran (50 ml.) is stirred at 20° C. for 1 hour and filtered. To this filtrate is added 4-(4-chlorophenoxy)-4-methylpentanoic acid (2.42 g., 0.01 mole) and the stirring is continued for 1 hour. Then 2-(diethylamino)ethylamine (3.18 g., 0.03 mole) is added and the reaction mixture allowed to stand overnight at ambient temperature. The solvent is removed by evaporation under vacuum and the residue is dissolved in ether. The ether extracts are washed with dilute aqueous sodium bicarbonate and then with water and then dried over anhydrous magnesium sulfate to yield 2.3 g. of an oily mixture which is purified chromatographically on 100 g. of silica gel using a mixture of benzene and methanol (19:1) as the solvent. By this method, 1.77 g. (47 percent yield) of pure N-(2-diethyl- aminoethyl)-4-(4-chlorophenoxy)-4-methylpentanamide is obtained.

Elemental analysis for $C_{18}H_{29}ClN_2O_2$:

Calc.: C, 63.42; H, 8.58; N, 8.22;

Found: C, 63.93; H, 8.72; N, 8.13.

EXAMPLE 7

N-(2-Pyridylamino)-4-(4-chlorophenoxy)-4-methylpentanamide

A solution of 1-[4-(4-chlorophenoxy)-4-methyl- pentanoyl]imidazole is prepared by stirring a mixture of imidazole (6.8 g., 0.1 mole), thionyl chloride (2.86 ml., 0.025 mole) and tetrahydrofuran (125 ml.) at 20° C. for 15 minutes and then adding 4-(4-chlorophenoxy)-4-methylpentanoic acid (6.05 g., 0.025 mole). The mixture is allowed to stand overnight at ambient temperature and then filtered. The filtrate is diluted with tetrahydrofuran to a total volume of 150 ml. Thirty ml. of this solution are treated with 2-hydrazinopyridine (1.09 g., 0.01 mole) at ambient temperature overnight. The supernatant is separated and evaporated under vacuum to yield 2.27 g. of product which solidifies upon trituration with water. Recrystallization from methanol at −20° C. yields 0.32 g. (19 percent yield) of N-(2-pyridylamino)-4-(4-chlorophenoxy)-4-methylpentanamide, m.p. 111°–112° C.

Elemental analysis for $C_{17}H_{20}ClN_3O_2$:

Calc.: C, 61.16; H, 6.04; N, 12.59;

Found: C, 60.95; H, 5.82; N, 12.64.

EXAMPLE 8

N-Amino-3-(4-chlorophenoxy)-3-methylbutanamide

Step A: 1,1-Diphenyl-4-(4-chlorophenoxy)-4-methyl-1-pentanol

To magnesium turnings (2.66 g., 0.11 mole) covered with a minimum volume of ether is added bromobenzene (12.9 g.; 0.082 mole) at such a rate as to maintain vigorous reflux. After refluxing for an additional 0.5 hour, the reaction mixture is cooled and ethyl 4-(4-chlorophenoxy)-4-methylpentanoate (7.42 g., 0.027 mole) is added dropwise and the reaction mixture stirred overnight at ambient temperature. The reaction mixture is cooled in ice and a saturated solution of aqueous ammonium chloride is added until the Grignard complex is hydrolyzed. This mixture is filtered and the filtrate is washed with water. The ethereal extracts are dried over anhydrous magnesium sulfate and evaporated under vacuum to yield 9.4 g. of 1,1-diphenyl-4-(4-chlorophenoxy)-4-methyl-1-pentanol, m.p., 85°–104° C. which is triturated with petroleum ether (b.p., 30°–60° C.) to yield 6.70 g., m.p., 106°–110.5° C. Recrystallization from hexane (30 ml.) yields 6.05 g. (59 percent) of 1,1- diphenyl-4-(4-chlorophenoxy)-4-methyl-1-pentanol, m.p., 112°–113° C.

Elemental analysis for $C_{24}H_{25}ClO_2$:

Calc.: C, 75.67; H, 6.62; Cl, 9.31;

Found: C, 75.90; H, 6.69; Cl, 9.18.

Step B: 1,1-Diphenyl-4-(4-chlorophenoxy)-4-methyl-1-pentene

A solution of 1,1-diphenyl-4-(4-chlorophenoxy)-4-methyl-1-pentanol (3 g., 0.0079 mole) and boron trifluoride etherate (4 ml.) in ether (150 ml.) is allowed to stand for 24 hours at ambient temperature. The solution is successively washed with a saturated aqueous sodium bicarbonate solution and water and then dried over anhydrous magnesium sulfate. The solvent is evaporated under vacuum to yield 1.93 g. of product which is crystallized twice from petroleum ether (b.p., 30°–60° C.) to yield 0.5 g. (17 percent yield) of 1,1-diphenyl-4-(4-chlorophenoxy)-4-methyl-1-pentene, m.p., 84°–85° C.

Elemental analysis for $C_{24}H_{23}ClO$:

Calc.: C, 79.43; H, 6.39;

Found: C, 79.58; H, 6.19.

Step C: 3-(4-Chlorophenoxy)-3-methylbutyric acid

A solution containing chromium trioxide (9.1 g.), glacial acetic acid (49 ml.) and water (7 ml.) is cooled and added over a period of 1.5 hours to a solution of 1,1-diphenyl-4-(4-chlorophenoxy)-4-methyl-1-pentene (8.95 g., 0.025 mole) in glacial acetic acid (75 ml.). Care is taken to keep the temperature below 45° C. for 0.5 hour. The reaction mixture is cooled, diluted with water and extracted with ether. The ethereal extracts are washed with water and then extracted with 5 percent aqueous sodium hydroxide. The aqueous sodium hydroxide extracts are acidified with 6 N hydrochloric acid, and extracted with ether. The ether solution is washed with water and dried over anhydrous magnesium sulfate. Evaporation under vacuum yields 3.45 g. of product which is recrystallized three times from petroleum ether (b.p., 30°–60° C.) to yield 1.05 g. (18 percent yield) of 3-(4-chlorophenoxy)-3-methylbutyric acid, m.p. 51°–52° C.

Elemental analysis for $C_{11}H_{13}ClO_3$:

Calc.: C, 57.77; H, 5.73; Cl, 15.51;

Found: C, 57.92; H, 5.83; Cl, 15.52.

Step D: Methyl 3-(4-chlorophenoxy)-3-methylbutyrate

By substituting an equimolar amount of 3-(4-chlorophenoxy)-3-methylbutyric acid for the 4-(4-chlorophenoxy)-4-methylpentanoic acid used in example 2, step A, and carrying out the reaction as described in example 2, step A, there is obtained methyl 3-(4-chlorophenoxy)-3-methylbutyrate.

Step E: N-Amino-3-(4-chlorophenoxy)-3-methylbutanamide

By substituting an equimolar amount of methyl 3-(4-chlorophenoxy)-3-methylbutyrate for the ethyl 4-(4-chlorophenoxy)-4-methylpentanoate used in example 1, step G, and carrying out the reaction as described in example 1, step G, there is obtained N-amino-3-(4-chlorophenoxy)-3-methylbutanamide.

EXAMPLE 9

N-Amino-5-(4-chlorophenoxy)-5-methylhexanamide

Step A: 4-(4-Chlorophenoxy)-4-methyl-1-pentanol

To a cooled mixture of lithium aluminum hydride (2.5 g., 0.066 mole) in ether (100 ml.) is added a solution of ethyl 4-(4-chlorophenoxy)-4-methylpentanoate (26.26 g., 0.097 mole) in ether (50 ml.). After standing overnight, the mixture is refluxed with stirring for 4 hours, cooled and hydrolyzed by the cautious addition of water and then 6N hydrochloric acid.

The ether phase is washed with water and dried over anhydrous magnesium sulfate to yield 18.44 g. (83 percent yield) of 4-(4-chlorophenoxy)-4-methyl-1-pentanol.

Step B: 1-Bromo-4-(4-chlorophenoxy)-4-methylpentane

To a solution of phosphorus tribromide (6 g., 0.22 mole) and pyridine (4 ml.) in benzene (10 ml.) cooled below 0° C. is added dropwise a solution of 4-(4-chlorophenoxy)-4-methyl-1-pentanol (8.9 g., 0.039 mole), pyridine (1 ml.) and benzene (2 ml.). After stirring at ambient temperature overnight, water and ether are added. The ether phase is washed successively with dilute hydrochloric acid, 5 percent aqueous sodium hydroxide and water. The ether extracts are dried over anhydrous magnesium sulfate and evaporated under vacuum to yield 6.60 g. (58 percent yield) of 1-bromo-4-chlorophenoxy)- 4-methylpentane.

Step C: 5-(4-Chlorophenoxy)-5-methylhexanonitrile

A mixture of 1-bromo-4-(4-chlorophenoxy)-4-methylpentane (8.85 g., 0.03 mole) and sodium cyanide (1.7 g., 0.035 mole) in a 2-methoxyethanol (100 ml.) is refluxed overnight. The solvent is evaporated under vacuum at a steam bath temperature and to the residue is added water and ether. The ethereal solution is washed with water, dried over anhydrous magnesium sulfate and evaporated under vacuum to yield 5.05 g. (61 percent yield) of 5-(4-chlorophenoxy)--5-methylhexanonitrile.

Step D: 5-(4-Chlorophenoxy)-5-methylhexanoic acid

A mixture of potassium hydroxide (6 g.), water (10 ml.), ethanol (10 ml.) and 5-(4-chlorophenoxy)-5-methylhexanonitrile (5.05 g., 0.021 mole) is refluxed for 48 hours. The two phase system is evaporated under vacuum at steam bath temperature to yield a residue which is then dissolved in water. The aqueous solution is washed with ether and acidified with dilute hydrochloric acid to yield a precipitate which is dissolved in ether, washed with water and dried over anhydrous magnesium sulfate. This dried ethereal solution is decolorized with charcoal, filtered and evaporated under vacuum to yield 2.38 g. of 5-(4-chlorophenoxy)-5-methylhexanoic acid, m.p. 77°–81° C., which is recrystallized from cyclohexane (5.0 ml.) to yield 1.71 g. (32 percent yield) of 5-(4-chlorophenoxy)-5-methylhexanoic acid, m.p., 81.5°–82° C.
Elemental analysis for $C_{13}H_{17}ClO_3$:
Calc.: C, 60.81; H, 6.68; Cl, 13.81;
Found: C, 61.10; H, 6.76; Cl, 13.60.

Step E: Methyl 5-(4-chlorophenoxy)-5-methylhexanoate

By substituting an equimolar amount of 5-(4-chlorophenoxy)-5-methylhexanoic acid for the 4-(4-chlorophenoxy)-4-methylpentanoic acid used in example 2, step A, and carrying out the reaction as described in example 2, –A, there is C.) 5-(4-chlorophenoxy)-5-methylhexanoate.

Step F: N-Amino-5-(4-chlorophenoxy)-5-methylhexanamide

By substituting an equimolar mixture of methyl 5-(4-chlorophenoxy)-5-methylhexanoate for the ethyl 4-(4-chlorophenoxy)-4-methylpentanoate used in example 1, step G, and carrying out the reaction as described in example 1, step G, there is obtained N-amino-5-(4-chlorophenoxy) -5-methylhexanamide.

EXAMPLE 10

N-Methyl-4-(4-chlorophenoxy)-4-methylpentanamide

To a mixture of imidazole (1.36 g., 0.02 mole) and thionyl chloride (0.57 ml, 0.005 mole) in a dry tetrahydrofuran (30 ml.) is added 4-(4-chlorophenoxy)-4-methylpentanoic acid (1.21 g., 0.005 mole). This mixture is stirred for 1 hour and then filtered. To the filtrate is added triethylamine (0.7 ml.) and excess gaseous methylamine. After standing overnight at 25° C., the solvent is removed in vacuo at approximately 50° C. to give a liquid residue in which is dissolved in ether. The ethereal solution is washed first with 3N hydrochloric acid, then with saturated sodium bicarbonate and finally with water. This solution is dried over anhydrous magnesium sulfate and evaporated in vacuo to give 1.09 g. of product (m.p., 88°–89.5 ° C.) which is recrystallized from 50 ml. of n-heptane to yield 0.9 g. (70 percent yield) of N-methyl-4-(4-chlorophenoxy)-4-methylpentanamide, m.p. 89.5°–90° C.
Elemental analysis for $C_{12}H_{16}ClNO_2$:
Calc.: C, 16.05; H, 7.09; N, 5.48;
Found: C, 16.41; H, 7.38; N, 5.46.

EXAMPLE 11

N-Amino-6-(4-chlorophenoxy)-6-methylheptanamide

Step A: Trimethyl 4-phosphonocrotonate

Methyl 4-bromocrotonate (89.5 g., 0.5 mole) is added dropwise to trimethyl phosphite (62 g., 0.5 mole) at 95° C. in 1 hour. After the addition, the mixture is heated for 4 hours at 98° C. and finally for 45 minutes at 130° C. Distillation gives a fraction (b.p., 100°–137° C. at 0.8 mm.) which is redistilled to yield 19.4 g. (18 percent yield) of trimethyl 4-phosphonocrotonate, b.p., 124°–130° C. (1 mm.).

Step B: Methyl 6-(4-chlorophenoxy)-6-methyl-2,4-heptadienoate

To a mixture of 60 percent sodium hydride (2.96 g., 0.073 mole suspended in mineral oil) in dimethylformamide (100 ml.) is added, in 15 minutes at 10° trimethyl 4-phosphonocrotonate (17 g., 0.082 mole) in dimethylformamide (20 ml.). This mixture is stirred at 25° C. for 20 minutes and then 2-(4-chlorophenoxy)-2-methyl-propionaldehyde (14.9 g., 0.075 mole) in dimethylformamide (20 ml.) is added to the reaction mixture in 20 minutes during which time the temperature is maintained at 40° C. After the addition, the mixture is stirred at 45° C. for 4.5 hours. The solvent is removed in vacuo and water (250 ml.) and ether (250 ml.) is added to the residue. The water layer is extracted with ether (2 ×100 ml.) and the combined ether extracts are washed with water, dried over anhydrous magnesium sulfate and the solvent evaporated in vacuo to yield 20.7 g. of methyl 6-(4-chlorophenoxy)-6-methyl-2,4-heptadienoate.

Step C: Methyl 6-(4-chlorophenoxy)-6-methylheptanoate

A mixture of methyl 6-(4-chlorophenoxy)-6-methyl- 2,4-heptadienoate (20 g., 0.071 mole) and of 10 percent Ruethenium on carbon (4.5 g.) in ethanol (100 ml.) is hydrogenated in a Parr apparatus at an initial pressure of 39 p.s.i. The catalyst is removed by filtration and the filtrate is evaporated in vacuo to give 20.4 g. of 6-(4-chlorophenoxy)-6-methylheptanoate.

Step D: 6-(4-Chlorophenoxy)-6-methylheptanoic acid

A mixture of methyl 6-(4-chlorophenoxy)-6-methylheptanoate (20.4 g., 0.07 mole) potassium hydroxide (4.5 g., 0.08 mole), water (20 ml.) and ethanol (250 ml.) is refluxed overnight. The solvent is removed in vacuo to give a residue to which is added water (300 ml.) and ether (100 ml.). The aqueous phase is acidified with 6N hydrochloric acid and then extracted with ether (3 ×100 ml.). The ether extracts are washed with water, dried over anhydrous magnesium sulfate and evaporated to give 12.2 g. of 6-(4-chlorophenoxy)-6-methylheptanoic acid, m.p., 52°–58° C. which is treated with cyclohexylamine to give 9.0 g. of the cyclohexylamine salt, m.p., 118°–120° C. This salt is acidified with 6N hydrochloric acid to give 7.2 g. (38 percent) of 6-(4-chlorophenoxy)-6-methylheptanoic acid (m.p., 61.5°–63.5° C.) which after recrystallization from hexane (3 ml.) melts at 63°–65° C.
Elemental analysis for $C_{14}H_{19}ClO_3$:
Calc.: C, 62,10; H, 7.07;
Found: C, 62.03; H, 6.92.

Step E: N-Amino-6-(4-chlorophenoxy)-6-methylheptanamide

By substituting equimolar amounts of 6-(4-chlorophenoxy)-6-methylheptanoic acid and hydrazine for 4-(4-chlorophenoxy)-4-methylpentanoic acid and 2-hydrazinopyridine, respectively, in example 7, there is obtained N-amino-6-(4-chlorophenoxy)-6-methylheptanamide.

In a manner similar to that described in example 1, all of the products described in table 1, infra, may be obtained. Thus, by substituting the appropriate halophenol for the p-chlorophenol of step A, example 1, and the appropriate trialkylphosphonoacetate for the triethylphosphonoacetate of step E, example 1, and by substituting the appropriate amine for the hydrazine of step G, example 1, and by following the procedure described in Steps A through G in example 1, the products of table 1 are obtained. The following equation illustrates how the products of table 1 may be obtained:

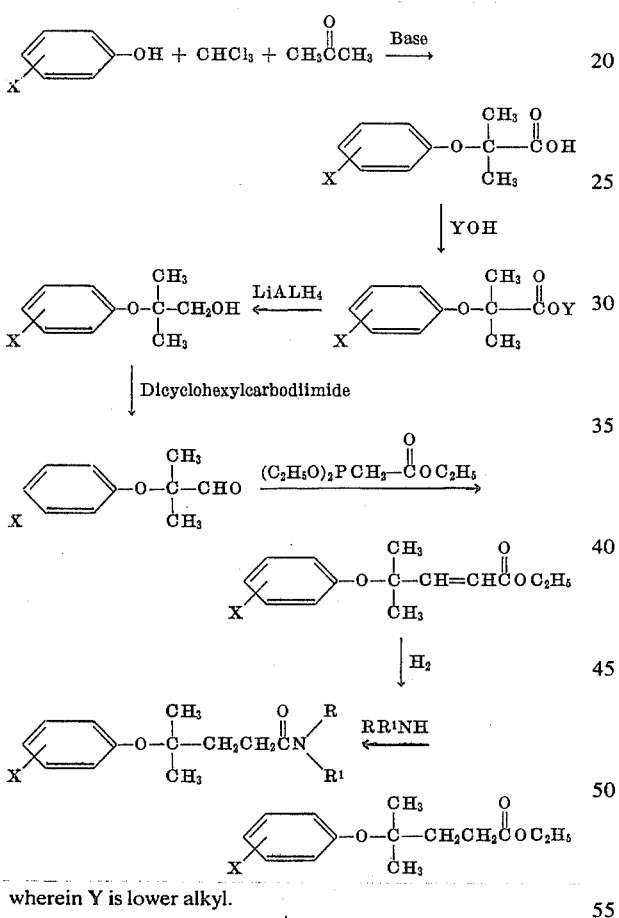

wherein Y is lower alkyl.

TABLE OF EXAMPLES

Table I

| Example | —NRR¹ | X |
|---|---|---|
| 12 | —NH₂ | 4 Cl |
| 13 | —NHC₂H₅ | 4 Br |
| 14 | —NHCH₂—⟨phenyl⟩ | 3 Cl |
| 15 | —N(CH₃)(OCH₃) | 4 Cl |
| 16 | —N(CH₃)₂ | 2 Cl |
| 17 | —NH—C(=NH)—NHCH₃ | 4 Cl |

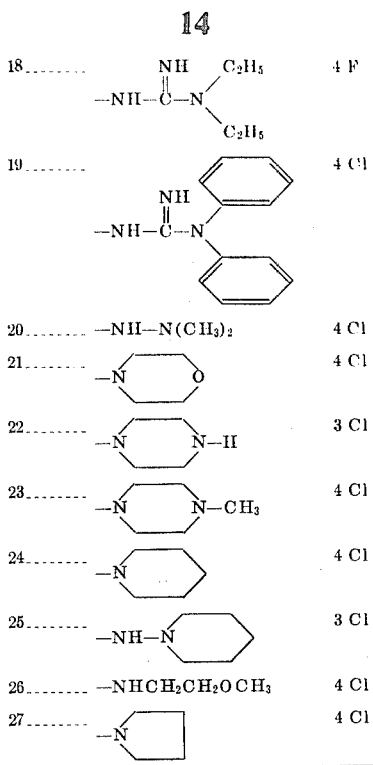

| 18 | —NH—C(=NH)—N(C₂H₅)₂ | 4 F |
| 19 | —NH—C(=NH)—N(phenyl)₂ | 4 Cl |
| 20 | —NH—N(CH₃)₂ | 4 Cl |
| 21 | —N(morpholino) | 4 Cl |
| 22 | —N(piperazino)—H | 3 Cl |
| 23 | —N(piperazino)—CH₃ | 4 Cl |
| 24 | —N(piperidino) | 4 Cl |
| 25 | —NH—N(piperidino) | 3 Cl |
| 26 | —NHCH₂CH₂OCH₃ | 4 Cl |
| 27 | —N(pyrrolidino) | 4 Cl |

The products of the invention can be administered in a wide variety of therapeutic dosages in conventional vehicles as, for example, by oral administration in the form of a capsule or tablet as well as by intravenous injection. Also, the dosage of the products may be varied over a range as, for example, in the form of capsules or scored tablets containing 5, 10, 20, 25, 50, 100, 150, 250 and 500 milligrams, that is, from 5 to about 500 milligrams, of the active ingredient administered from once to four times daily for the symptomatic adjustment of the dosage to those to be treated. These dosages are well below the toxic or lethal dose of the products.

A suitable unit dosage form of the products of this invention can be prepared by mixing 100 milligrams of an amide of ω, ω-dimethyl-ω(halophenoxy)alkanoic acid, with 88 mg. of lactose and 12 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to those skilled in the art.

It is also within the scope of this invention to combine two or more of the compounds of this invention in a unit dosage form or to combine one or more of the compounds with other known hypolglycemics or with other desired therapeutic and/or nutritive agents in dosage unit form.

The following example is included to illustrate the preparation of a representative dosage form.

EXAMPLE 28

Dry-filled capsules containing 100 mg. of active ingredients Per Capsule

| | Per Capsule |
|---|---|
| N-Amino-3-(4-chlorophenoxy)-3-methylbutamide | 100 mg. |
| Lactose | 88 mg. |
| Magnesium stearate | 12 mg. |
| Capsule Size No. 3 | 200 mg. |

The N-amino-3-(4-chlorophenoxy)-3-methylbutamide is reduced to a No. 60 powder and then lactose and magnesium stearate are passed through a No. 60 bolting cloth onto the powder and the combined ingredients are mixed for 10 minutes and then filled into a No. 3 dry gelatin capsule.

Similar dry-filled capsules can be prepared by replacing the active ingredients of the above example by any of the other novel compounds of this invention.

It will be apparent from the foregoing description that the ω,ω-dimethyl-ω(halophenoxy)alkanamides of this invention constitute a valuable class of compounds which have not been prepared before. One skilled in the art will also appreciate that the processes disclosed in the above examples are merely illustrative and are capable of a wide variation and modification without departing from the spirit of the invention.

We claim:

1. A compound of the formula:

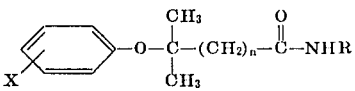

wherein R is amino, lower alkylamino or pyridylamino; $n$ is an integer having a value of 1–4 and X is halo.

2. A compound according to claim 1 of the formula:

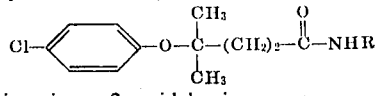

wherein R is amino or 2-pyridylamino.

3. The compound of claim 1, wherein R is a methylamine
4. The compound of claim 2, wherein R is amino.
5. The compound of claim 2, wherein R is 2-pyridylamino.

* * * * *